Dec. 6, 1966 J. E. GEUSIC ETAL 3,290,619

HIGHLY EFFICIENT DEVICES USING CENTRO-SYMMETRIC PEROVSKITE CRYSTALS BIASED TO SEVERAL $\pi$ PHASE RETARDATIONS

Filed March 19, 1964 3 Sheets-Sheet 1

INVENTORS J. E. GEUSIC
L. G. VAN UITERT
BY George S. Indig
ATTORNEY

PARAMETRIC AMPLIFIER

TRAVELING WAVE
PARAMETRIC AMPLIFIER

AMPLITUDE MODULATOR

MICROWAVE MODULATOR

MICROWAVE PHASE SHIFTER

United States Patent Office
3,290,619
Patented Dec. 6, 1966

3,290,619

HIGHLY EFFICIENT DEVICES USING CENTRO-SYMMETRIC PEROVSKITE CRYSTALS BIASED TO SEVERAL $\pi$ PHASE RETARDATIONS

Joseph E. Geusic, Berkeley Heights, and LeGrand G. Van Uitert, Morris Township, Morris County, N.J., assignors to Bell Telephone Laboratories, Incorporated, New York, N.Y., a corporation of New York Filed Mar. 19, 1964, Ser. No. 353,049
14 Claims. (Cl. 332—7.51)

This invention relates to device elements in which the nature of the electromagnetic waves is altered within centro-symmetric materials by application of electric fields. In one exemplary embodiment, the invention relates to device elements utilizing compositions within the potassium tantalate-niobate system (hereinafter referred to as "KTN") as the active material and to devices utilizing such elements. All included devices depend for their operation on the dependence of transmission properties on applied electrical field.

The class of devices herein relies on the electro-optic effect, or on the analogous effect, for electromagnetic transmission of lower frequencies ranging through the millimeter range, microwave range, and below. In all of these devices, operation depends on the fact that an impressed electrical field causes a variation in dielectric constant. It is characteristic of the materials of the KTN system here discussed that this variation in dielectric constant is particularly pronounced. This class includes a large number of proposed devices, such as those which depend upon the rotation of polarized energy or merely upon the phase retardation of transmitted energy. It is well known that such devices may serve many functions, as, for example, amplification, discrimination, modulation, etc., and that any may be arranged so as to operate in a digital or analog manner. Several such devices, operation of which is significantly enhanced by the use of KTN, are described herein.

While the characteristics responsible for the device characteristics set forth are seen in a broad range of KTN compositions containing as little as about 20 percent of either of the end members, $KTaO_3$ and $KNbO_3$, a preferred range exists for the device uses here described. This is conveniently set forth by defining the KTN system as $KTa_xNb_{1-x}O_3$ over the range of from $x$ equals 0.56 to 0.68, inclusive. It is generally true for every included member of the broader range that the dependence of the concerned transmission characteristic on the magnitude of the applied electrical field is enhanced, with little attendant degradation in Q. This is of particular importance in the preferred range set forth, where this high dependence and low loss quality apply over usual device operating conditions.

It is a little recognized fact that the electro-optic effect, as well as other effects based on a variation in dielectric constant with applied field, is necessarily a second order effect in a crystalline material having a center of symmetry. KTN is a member of that class and, further, is inherently highly polarizable. The centro-symmetric perovskite structure results in the possibility of biasing the active element to levels at which a $\pi$ rotation may be accomplished with very low modulating fields. In some of the devices herein, such modulating fields may be of peak-to-peak levels of such order as to be readily handled by transistor circuitry.

For certain of the devices discussed herein, particularly those operating on electromagnetic transmission at optical or near optical frequencies, it is desirable to utilize highly transparent bodies of KTN. It is significant that these materials may be grown easily by, for example, the Czochralski technique. Suitable growth conditions, as well as appropriate measures that may still further improve the optical perfection of the growing crystals, are described herein. Certain of these improvisations take the form of deliberate compositional inclusions. Accordingly, the formula set forth above is intended to define only the ratio of the end members, $KTaO_3$ and $KNbO_3$ in the final composition.

Certain of the included devices, particularly those operating at low frequency, may utilize polycrystalline bodies of the KTN composition. Since these materials may be easily prepared by ordinary hot pressing techniques, now used, for example, for potassium-sodium niobate ferroelectric bodies, and since these procedures are well known to those skilled in the art, they are not described. Suitable hot pressing techniques are set forth in: "Treatise on Powder Metallurgy" by C. G. Goetzel, Interscience Publishers, Inc., New York (1949).

In accordance with this invention, therefore, it has been discovered that members of the KTN system containing at least 20 percent of either end member $KTaO_3$ or $KNbO_3$, having the preferred composition range as set forth, manifest unusually strong variations in dielectric constant under the influence of an applied electrostatic field coupled with low loss, in turn giving rise to the use of these materials in a large class of devices.

For convenience, the illustrative physical and electrical properties are tabulated below. All of these values have actually been measured on materials grown in accordance with the examples set forth.

*Peak dielectric constant.*—30,000, as measured at frequencies up to 100 kmc.

*Index of refraction.*—2.3 over the visible and near visible band.

*Absorptions.*—from about 1000 kmc. up to about 6 microns and above .3 micron.

*Electrical Q.*—about 200–500 down to about 5 degrees above the Curie point; about 150 within 5 degrees of the Curie point.

*Acoustical Q.*—40,000 at 500 mc.

*Hardness.*—comparable to quartz—about 6 mhos.—sufficient to take a good optical polish.

*Stability.*—good both physically and chemically—not readily soluble in acids or bases.

*Growth.*—single crystals by Czochralski or other techniques—polycrystals by hot pressing.

*Crystal class.*—perovskite (body centered cubic, therefore not birefringent in the absence of an applied field and having several equivalent directions for application of field or transmission of wave energy).

*Device fabrication.*—may be cut and polished in manner of quartz.

Electrode application is desirably by evaporation of silver or aluminum, for example. Temporary electrodes may be applied by use of indium gallium eutectic, or capacitative mount may be used.

Description of the invention is expedited by reference to the drawings, in which.

Figures 1, 3, 4:
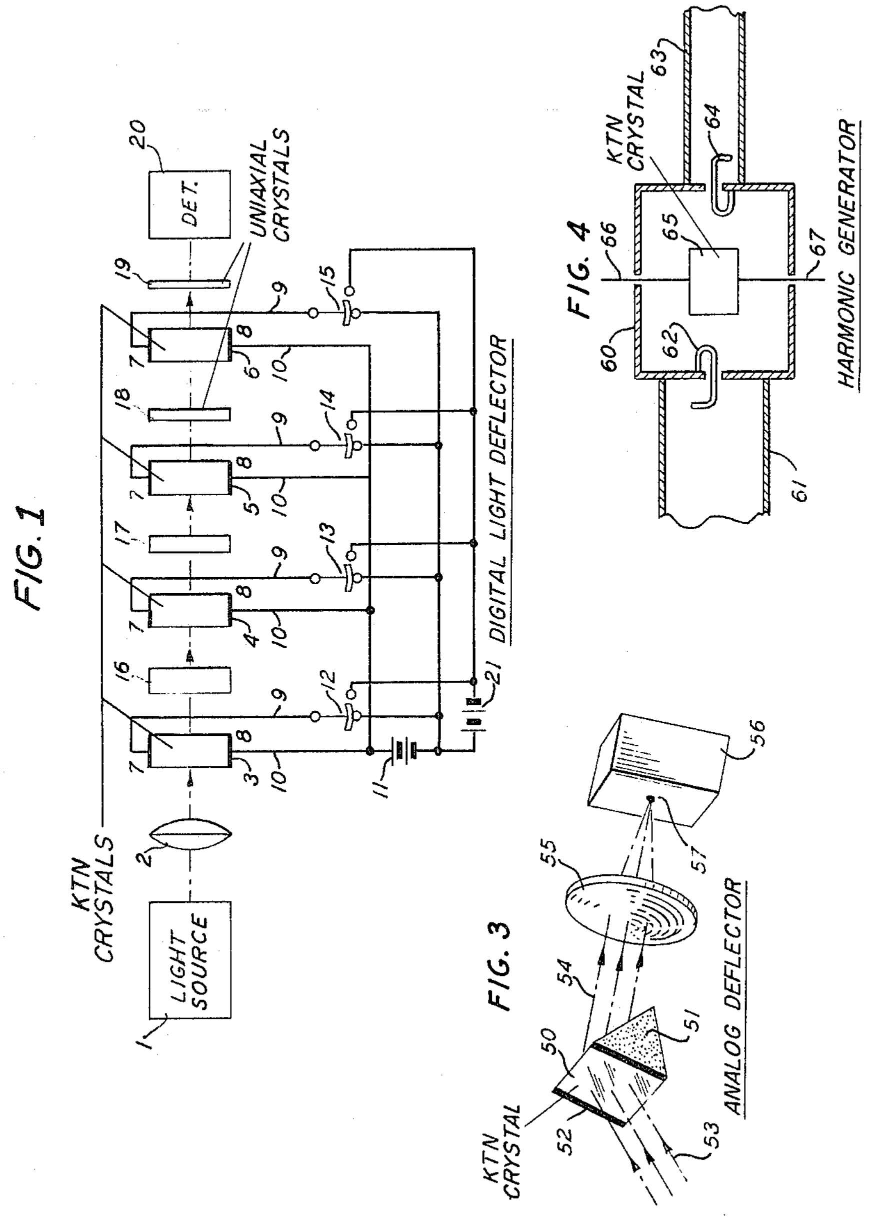
FIG. 1 is a schematic representation of a digital light deflector utilizing crystals of KTN as rotating media.
FIG. 3 is a perspective view of an alternate form of modulator utilizing a crystal of KTN.
FIG. 4 is a front elevational view, partly in section, of an harmonic generator utilizing KTN.

Referring again to FIG. 1, the device depicted is a digital light deflection unit of the type described in copending application Serial No. 239,948, filed November 26, 1962. The device may be employed in a wide variety of systems including information storage, retrieval, telephone switching, optical data communication, computer, etc. The device depicted includes polarized light source 1, lens 2, KTN rotating elements 3, 4, 5, and 6, each having associated electrodes 7 and 8, to which are attached leads 9 and 10, respectively, in turn attached to biasing sources 11 and 21 through shorting switches 12, 13, 14, and 15, uniaxial crystals 16, 17, 18 and 19, each in succession being half the thickness in the direction of transmission of the preceding member of the series and, finally, detector 20. The operation of this device in a specific application is discussed in Example 1. Very briefly, this device depends for its operation on the ability of a uniaxial material to displace polarized light having a polarization direction other than parallel or normal to the unique axis. For a normal direction of polarization, light transmission obeys Snell's law. The function of the rotating elements is, as the name implies, to rotate the source of polarization by 90 degrees, so as to permit through-transmission or displaced transmission in the following uniaxial elements 16 through 19. Polarized light is produced at source 1 and is focused through lens 2. The field necessary to bring about a $\pi$ rotation in the biased crystal is produced by D.-C. source 21 and is applied to any of the desired rotating elements 3 through 6 by means of shorting switches 12 through 15, so completing the electrical circuit across concerned electrodes 7 and 8. As has been indicated, since the field required to produce a $\pi$ rotation decreases quadratically with increasing bias, it is desirable to have a fixed bias across the KTN crystals, constituting rotating elements 3 through 6. Such fixed bias is applied by means of D.-C. source 11. Detection is accomplished at element 20. The precise position of a light spot leaving uniaxial element 19 is dependent on the presence or absence of field in each of rotating elements 3 through 6. As illustrated in Example 1, feasible designs may result in 250,000 light positions per square inch.

Figure 2:
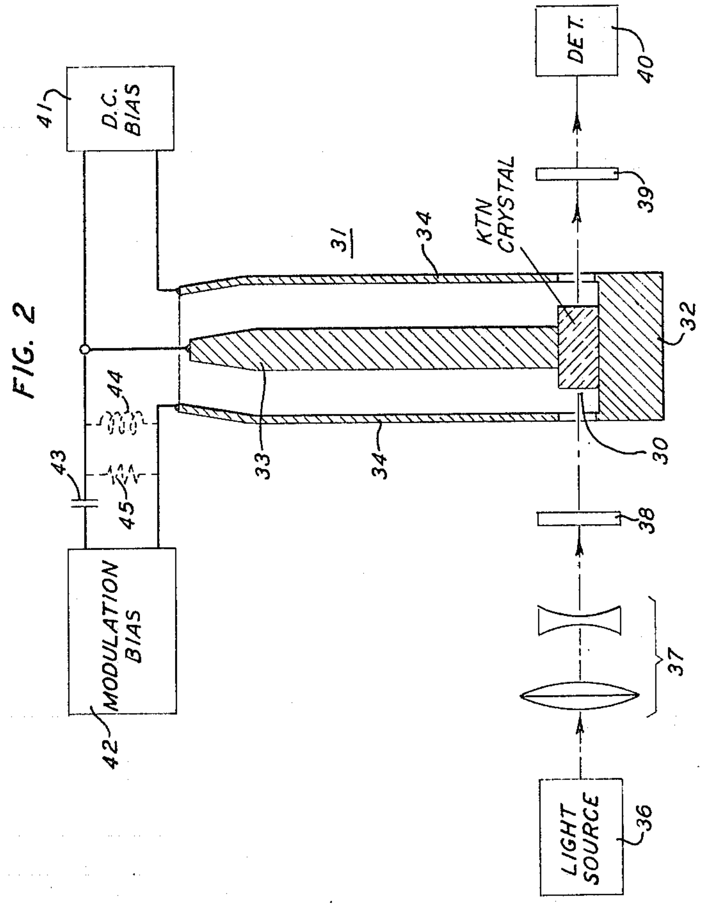
FIG. 2 is a sectional view of a modulator which may operate as a baseband or resonant device.

The device of FIG. 2 is an amplitude modulator which may operate as a baseband modulator or as a resonant device. It consists of KTN crystal 30, placed within coaxial configuration 31, consisting of platform 32, inner conductor 33, and outer conductor 34. Polarized light produced from laser or other source 36 is focused by means of a Galilean telescope 37 and passes through polarizer 38 before reaching crystal 30. Upon leaving crystal 30, the light beam passes through analyzer 39, which in the simplest embodiment is a crossed polarizer. Upon leaving analyzer 39, the beam is then detected by an amplitude detector system 40. Crystal 30 is maintained biased to $n+\frac{1}{2}\pi$ rotations by D.-C. bias source 41. As has been indicated, the purpose of the fixed bias is to permit low voltage rotation due to the quadratic relationship between rotation and applied field. Modulation information is introduced by means of modulation bias source 42, which is isolated from D.-C. bias source 41 by capacitor 43. The maximum bias produced by source 42 is that necessary for complete $\pi$ rotation at the applicable D.-C. level. The sense of plane polarization produced by element 38 and the crystallographic positioning of element 30 is such that the sense of polarization produced is at 45 degrees to two principal axes of the KTN crystal. With zero modulation, the crystal is essentially isotropic, so that the velocity of propagation through the crystal is equal in all directions. For any other condition, a phase retardation results along one of the principal directions, so resulting in rotation. This is seen at detector 40 as a variation in amplitude resulting from the varying amount of light passed by analyzer 39 as the rotated energy conforms more or less to the direction of polarization of this element.

Operating as a base band modulator, the device of FIG. 2 is useful from D.-C. up to 100 or a few hundred megacycles, with power dissipated in the sample at a level of the order of 3½ milliwatts (see Example 2). For higher frequencies, it is useful to operate as a resonant device. This may be accomplished by use of an element depicted as lumped inductance 44 and resistance 45, shown in dashed lines. The value of inductance 44 is so chosen as to satisfy the relationship $$f=\frac{1}{\sqrt{LC}}$$

for resonance at the desired frequency. The effective resistance 45 determines the value of Q, i.e.

$$Q=\frac{W}{\Delta W}=\frac{L}{R}$$

In FIG. 3, there is shown one form of analog deflector operating over the visible and near visible spectrum. The device is depicted schematically as including a prism of KTN having electrodes affixed at 51 and 52, said electrodes being connected with D.-C. biasing source and A.-C. modulating source, for example, in the manner discussed in connection with FIG. 2 (not shown). Polarized light, shown as arrows 53, is introduced into prism 50 from a source not shown. Polarized light, shown as arrows 54, leaves prism 50 and is focused by lens 55 on position-sensitive detector 56. The amount of deflection introduced by prism 50 is dependent on the index of refraction which is, in turn, field dependent. In this manner, the magnitude of the field across prism 50 within a maximum range necessary to produce a maximum phase retardation produces a light spot at 57 which has unique reference to the applied voltage. Detector 56 may utilize, for example, a fixed aperture or apertures at the focal plane of 55 and may measure the intensity or simply the presence or absence of light at any given position.

The device of FIG. 3 may be used either alone or in conjunction with an additional prism such as 50 having its bisecting plane normal to that of prism 50 (so permitting two-way deflection). In a display arrangement for this purpose, detector 56 may take the form of a phosphorescent screen.

FIG. 4 is an harmonic generator intended for operation at microwave frequencies up into the millimeter range, of the order of hundreds of kilomegacycles. It consists of a cavity 60 designed so as to be resonant both at an introduced frequency and at a second harmonic frequency ($\omega_1$ and $2\omega_1$). Energy is introduced through guide 61 into coupling probe 62 and departs through guide 63 by way of probe 64 tuned to the harmonic frequency. The active element in the device is, again, a crystal of KTN 65, provided with electrodes 66 and 67, through which a D.-C. bias is applied from a source not shown.

Figure 5:
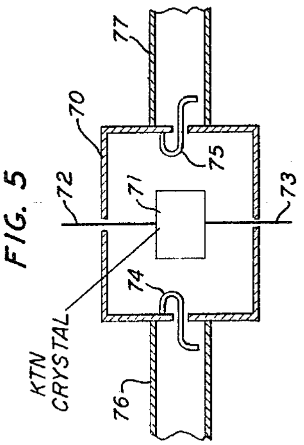
FIG. 5 is a front elevational view, partly in section, of a cavity-type parametric amplifier.

The device of FIG. 5 is, in general configuration, similar to that of FIG. 4. This embodiment is, however, designed to operate as a cavity-type parametric amplifier. It consists of cavity 70, designed so as to be resonant at the three frequencies $\omega_p$ (pump frequency), $\omega_i$ (idler frequency), and $\omega_s$ (signal frequency). KTN crystal 71 is again D.-C. biased to several $\pi$ rotations by means of electrodes 72 and 73, connected to source not shown, so as to increase the dependence of dielectric constant on the pump frequency. Probes 74 and 75 permit effective coupling and minimize reflections. Inlet guide 76 permits introduction of both signal and pump energy. Outlet guide 77 cooperates with probe 75 in permitting the extraction of essentially pure signal.

Figure 6:
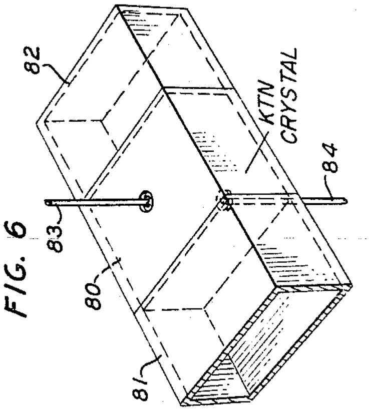
FIG. 6 is a perspective view of a traveling wave parametric amplifier.

FIG. 6 is a traveling wave parametric amplifier consisting of a waveguide 80 filled with KTN of dimensions such as to support the three frequencies $\omega_p$, $\omega_i$, and $\omega_s$, provided with inlet guide 81 and outlet guide 82. The KTN crystal, with which 80 is filled, is D.-C. biased by means of electrodes 83 and 84, connected to source not shown. The magnitude of the applied D.-C. voltage is, again, several $\pi$ rotations and is designed to increase the dependence of dielectric constant on the pump.

Figure 7:
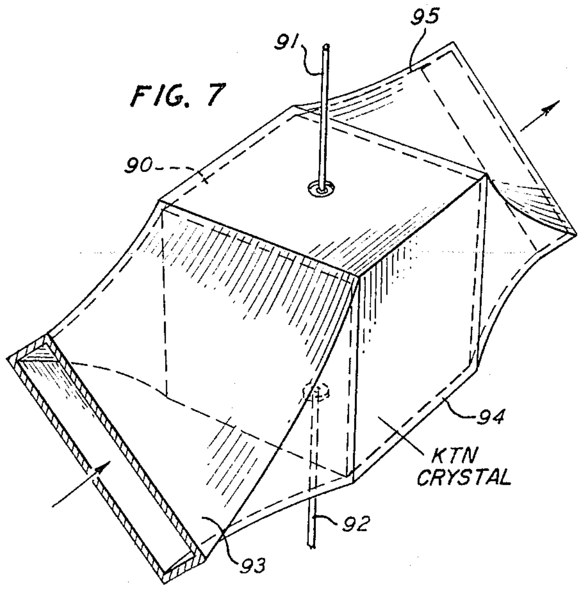
FIG. 7 is a perspective view of a microwave modulator.

FIG. 7 is a microwave modulator which may be schematically represented in the manner of FIG. 6. It consists of KTN crystal 90, having affixed electrodes 91 and 92, attached to D.-C. and modulating sources not shown, which may be connected in the manner of sources 41 and 42 of the device of FIG. 2. Unmodulated signal is introduced through guide portion 93 into filled cavity 94, where it is acted upon by crystal 90, and thereafter through guide 95. Crystal 90 is cut so as to have its major crystallographic axes corresponding with those of the crystal. Both inlet and outlet guide portions 93 and 95 are arranged with their major transverse axes at 45 degrees to two major crystallographic axes of crystal 90. Rotation of plane polarized energy within crystal 90 by use of the modulating bias reduces the size of the component which will be passed by section 95, so resulting in a change in amplitude.

Figure 8:
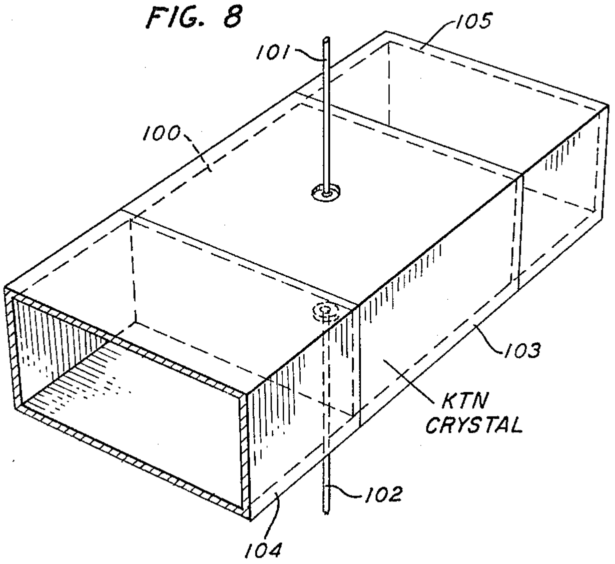
FIG. 8 is a perspective view of a microwave phase shifter.

FIG. 8 is a microwave phase shifter similar to the device of FIG. 7, however arranged with the major axes of both inlet and outlet portions of the guide corresponding with those of the KTN crystal which, in turn, correspond with the major crystallographic axes. Accordingly, KTN crystal 100, biased both by fixed D.-C. source and variable A.-C. source, neither of which is shown, across electrodes 101 and 102, fills guide 103. Signal energy is introduced through guide section 104 and leaves through guide portion 105. Since energy introduced is polarized in a crystallographic direction, for example, 001, biasing the crystal does not result in rotation. The effect of biasing is simply to change the dielectric constant of the KTN, so resulting in a phase retardation or acceleration, depending on the level of the D.-C. bias.

Note has been taken of the fact that many of the devices herein may make use of a polycrystalline body, for example as prepared by hot pressing. While this is obviously disadvantageous for any device operating on a signal in the visible or near visible spectrum, little objection exists in microwave devices. For particularly low frequency devices, polycrystalline bodies are perhaps equally suitable.

Illustrative examples are set forth below to demonstrate the magnitude of change of dielectric constant which may be accomplished for some biasing conditions. A detailed theoretical discussion of the mechanism responsible for the dependence of dielectric constant or index of refraction on applied field is not considered appropriate to this description. In terms of voltage gradients, it has been found that typical operating conditions may result in a quarter wave rotation or in a maximum variation in dielectric constant or refractive index with an applied voltage of as little as ten volts or less. Field requirements for a given number, $n$, of $\pi$ phase shifts follow the equation $$V_{n\pi}=\sqrt{n}V_{\pi} \qquad (1)$$

in which $V_{n\pi}$ is the voltage gradient required for $n\pi$ phase shifts, $n$ equals number of phase shifts, and $V_{\pi}$ equals voltage required to produce $\pi$ phase rotation. Accordingly, the sixteenth $\pi$ phase point results upon application of $\sqrt{16}$, or $4\times V_{\pi}$, which, if $V_{\pi}$ equals 640 volts, results in a requirement of 2560 volts. The seventeenth $\pi$ rotation at these levels results upon application of an additional 80 volts. The limitation on the D.-C. bias is the breakdown voltage gradient that can be applied to the crystal, which is of the order of 15,000 volts/cm.

The power required to charge and discharge the capacitance of the modular at some rate, R, may be determined from:

$$P_C=\tfrac{1}{2}CV^2_{(n\ \ n+1)\pi}R \qquad (2)$$

in which $P_c$ is the power required in watts, C is the capacitance of the modulator in farads, and R equals the repetition rate in pulses per second. $V_{(n,n+1)\pi}$ in Equation 2 equals $$\sqrt{n+1}-\sqrt{n}\,V_{\pi}\approx\frac{1}{2\sqrt{n}}V_{\pi}$$

and is the applied R.F. field gradient that must be applied to result in an additional $\pi$ phase shift.

Power dissipated in the crystal, $P_s$, is determined from:

$$P_S=\frac{P_C}{Q} \qquad (3)$$

where Q is the $n$ factor in dimensionless units.

The following examples are indicative of typical operating parameters:

EXAMPLE 1

This example relates to the operation of the digital light deflector of FIG. 1. It is premised on a detector 20 capable of yielding 250,000 bits/sq. in. Rotating elements such as 3 through 6 are of dimensions 1 cm. x 1 cm. x 1 cm. The KTN crystal is of the composition $KTa_{.63}Nb_{.37}O_3$. The dielectric constant, $\epsilon$, is about 10,000. Biasing each KTN crystal out to the $16\tfrac{1}{2}\pi$ phase point requires, for these dimensions, approximately 2560 volts, with, as has been discussed, 80 volts being required for a complete seventeenth rotation. For this size modulator, $C=800$ $\mu\mu$farads and required power, $P_c$, from Equation 2 is equal to $28\times10^7$ joules$\times$R, which for R equals $10^7$ pulses/sec., i.e., 10 mc./sec. rate, equals 28 watts. From Equation 3, and for a Q value of 150, $P_s$ (power dissipation) equals 28/150, or approximately 0.2 watt.

EXAMPLE 2

Operation of the baseband modulator of FIG. 2 and utilizing a crystal of 0.01" x 0.01" x 0.01" results in a required R.F. voltage, $V_{(16,17)\pi}$, of 17 volts. $V_{n\pi}$ for $16\tfrac{1}{2}\pi$ rotations equals 330 volts. For one hundred percent modulation, the required power to be supplied by the modulator, $P_c$, equals $1.8\times10^9$ joules times the modulation bandwidth. For a modulation bandwidth of 250 mc./sec., $P_c$ equals 2 watts. $P_s$, for a Q of 150, is equal to 1.2 milliwatts.

Discussion has thus far been largely in terms of device applications advantageously resulting from the discovery of the unusually efficient low loss coupling mechanisms which have been discussed. While such uses may be premised on single crystal or polycrystalline materials within the specified compositional ranges, it has been determined that certain of the properties may be optimized by use of particular growth conditions and by control of both included and excluded minor ingredients. The following discussion relates to these considerations. The most significant properties which are optimized, since they are concerned largely with crystalline perfection and with transmission properties in the visible and near visible frequency range, are concerned largely with device uses predicated on electro-optic properties. However, growth of more perfect crystals results generally in reduced loss properties and, consequently, in improved value of Q. For these reasons, adherence to the compositional limits and generalized growth conditions discussed is to be considered preferred in the preparation of crystals for any of the devices described herein, as well as for any other devices based on the relationships here of concern.

A preferred compositional KTN range has been set forth as $KTa_xNb_{1-x}O_3$, in which $x$ equals from 0.56 to 0.68. A still narrower range may be prescribed as that in which $x$ equals from 0.60 to 0.68. This range of atom ratios of tantalum to niobium is not varied by other compositional variations set forth.

In addition to the fundamental ingredients, there are two important compositional considerations. The first has to do with unintentional inclusions. Here, in addition to prescribing overall maximum impurity content of the order of one atom percent based on potassium, there are specific ingredients which should be kept to lower values, particularly for optical uses. To prevent reduction of tantalum or niobium to the $4^+$ state, it is necessary to maintain the level of calcium, chlorine, fluorine, strontium or barium at a maximum permissible level of the order of 0.1 atom percent total, based on the potassium present. Sodium or lithium inclusions substitute in potassium sites and have the general effect of reducing the dielectric constant of the material. Sodium should be kept to a 1.0 atom percent maximum and lithium at a 0.5 atom percent maximum, both based on the potassium present.

To maintain high resistivity values, of the order of $10^{10}$ ohm-cm. and higher, it is desirable to include one of the elements tin, silicon, germanium or titanium, of which tin is preferred. This inclusion, which probably owes its beneficial effect to the prevention of reduction of tantalum or niobium, should be in the range of from 0.0001 to 0.02 in atomic units based on the formula above. A preferred range of addition on this basis is from 0.0003 to 0.01.

It is well known that crystalline materials intended to transmit wave energy, particularly at higher frequencies, such as in the visible and near visible spectrum, are desirably as nearly perfect as possible. It is well known that optimum transmission properties are obtained by the elimination of inclusions, strains and other defects of sizes approaching or exceeding the wavelength of the energy to be transmitted. The KTN crystals of this invention are no exception. To aid the practitioner, a growth procedure found suitable and use of which resulted in certain of the crystals from which the measured properties here included were derived, is described.

The single crystal growth technique utilized was a modification of that of Czochralski. Growth was on an oriented seed lifted at a rate of about one-third of an inch a day, while being rotated at a rate of about 40 r.p.m. to minimize the effect of compositional gradients in the melt. The KTN compositions of concern have a melting point of approximately 1225 degrees C. Initial ingredients were rendered molten in a 300 cc. crucible by use of silicon carbide heating elements controlled by a saturable core reactor so as to maintain the temperature at the bottom of the crucible at about 1250° C. An oxygen-containing atmosphere such as air or oxygen was found desirable. The use of a high concentration of oxygen in the atmosphere tends to prevent reduction of niobium or tantalum, and in this manner may, to some extent, serve the function of the tin addition. In fact, where the reduction tendency is low, the use of tin may be obviated by use of an oxygen atmosphere.

By virtue of a higher tantalum distribution coefficient, growth of a prescribed composition requires an excess of niobium in the melt. To produce a composition within the range specified, in which $x$ is from 0.56 to 0.68, the amount of tantalum in the melt on the same basis ranges from about 0.24 to 0.35. Use of potassium deficiencies of more than 5 percent is observed to result in a structure different from the intended perovskite. Consequently, the amount of potassium in the melt should be at least as great as 5 percent deficient, based on stoichiometry. A permissible range is from 5 percent deficient up to an excess, of the order of 25 atom percent of the potassium present with a preferred range of from stoichiometry to a 15 atom percent excess. A still greater preference exists for a total inclusion in the melt of from stoichiometry to a 2 atom percent excess.

Tin, which may be added in the elemental form or as an oxide, is found to have a distribution coefficient of approximately unity. Accordingly, the amount in the melt is that desired in the final crystal.

It has been observed that quiescent growth conditions, probably due to the tendency of niobium to rise in the melt, result in an increased niobium content in successive portions of the grown crystal, the amount increasing at a rate somewhat in excess of that which would be theoretically expected. This gradient is of little or no consequence for most, if not all, applications, the size of the crystal element generally being so small as to minimize any electrical effect due to this ingredient. For mass production, however, where reproducibility is desirable, the tendency of the niobium concentration to increase at the crystal interface may be minimized by agitation. An oscillating crucible in the apparatus specifically discussed in conjunction with a rotated pulling crystal is suggested. Of course, the gradient is at least in part dependent on the size of the melt, such effects being minimized by the simple expedient of increasing the melt size. Alternative procedures which have found use in related arts include doping the melt at a rate such as to offset tantalum loss during growth. This doping may take any of the usual forms, i.e., pellet, powder, liquid, gas, or by use of continuous introduction of KTN composition at a rate and of a composition such as to exactly compensate.

The following typical example indicates starting ingredients and final composition:

| | Gms. |
|---|---|
| $K_2CO_3$ | 330 |
| $TA_2O_5$ | 304 |
| $Nb_2O_5$ | 448 |
| $SnO_2$ | 0.7 |

When the above components are reacted a melt having the approximate composition $KTa_{.29}Nb_{.71}O_3$:$Sn_{.001}$ is obtained. The grown crystal has the approximate composition $KTa_{.63}Nb_{.37}O_3$:$Sn_{.001}$.

Initial ingredients have been in the form of oxides or carbonates, and such compounds are considered most expedient. However, other compounds having melting points or reaction temperatures below the melt temperature of 1250° C. and which are otherwise suitable may be utilized. Obvious alternatives include, for example, the use of oxides, tantalates, or niobates of potassium.

While crystals grown in the described manner are possessed of excellent optical properties, it is found that still further improvement may result from highly polishing the seed or by a strain-relieving etch. For example, the use of molten potassium hydroxide over a temperature range slightly above its melting point of 360° C. for a few minutes has been found to reduce the light dispersion of a finely cut and polished crystal to a minimum. Improvements of the order of 50 db have been seen.

The invention has been described in terms of a limited number of device embodiments. An important aspect of the invention is considered to derive from the discovery that the variation of dielectric constant on applied electric field can be made high in this material and that this can be achieved with low loss. In fact, such dependence can be maximized with only slight attendant decrease in Q value. This discovery is considered to be of value in any device in which transmitted wave energy, is in any way modified by changing or adjusting dielectric constant under the influence of an applied electric field. Such an effect is considered to be of value in any device design accommodating any wave energy which can be passed through the KTN material, that is, any wave energy of a frequency or frequencies outside of the principal absorptions which have been noted.

The descriptive matter relating to compositional considerations and actual growth conditions, while including some information resulting in real improvement in properties for certain specified applications, is largely included for the assistance of the practitioner. For certain applications, compositional tolerances, particularly for unintentional impurities, may be considerably higher. Alternate single crystal growth techniques are known and may be utilized and, as has been indicated, for certain uses polycrystalline bodies prepared by conventional ceramic-forming techniques are suitable. Claims are to be construed accordingly.

What is claimed is:

1. Device comprising a body consisting essentially of an electro-optic perovskite crystalline material having a center of symmetry, together with a first means for applying a biasing electric field across at least a portion of the said body, the said biasing electric field being of sufficient magnitude to bias the said body to several $\pi$ phase retardations, together with a second means for applying a modulating electric field across at least a portion of the said body, the maximum value of said modulating electric field being sufficient to produce an additional $\pi$ phase retardation, and together with means for transmitting electromagnetic wave energy through a portion of the said body, the relationship between the said second means and the said electromagnetic wave energy being such that a variation in the former produces a variation in the latter.

2. Device of claim 1 in which the said crystalline material consists essentially of the composition:

$$KTa_xNb_{1-x}O_3$$

in which $x$ equals from 0.2 to 0.8.

3. The device of claim 2 in which $x$ equals from 0.56 to 0.68.

4. The device of claim 3 in which $x$ equals from 0.60 to 0.68.

5. The device of claim 2 in which the said composition additionally includes an element selected from the group consisting of tin, silicon, germanium, or titanium in the amount of from 0.0001 to 0.02 in atomic units based on the said composition.

6. The device of claim 5 in which the said element is tin, and in which the inclusion is in the amount of from 0.0003 to 0.01 in atomic units based on the said composition.

7. The device of claim 1 in which the said electromagnetic wave energy is in the visible including the near visible spectrum.

8. The device of claim 1 in which the said wave energy is introduced into the said body as plane polarized energy.

9. The device of claim 8 in which the plane of polarization of the said introduced energy is non-coincident with a major crystallographic axis of the said body.

10. The device of claim 9 in which the said transmission property is the plane of polarization.

11. The device of claim 10 in which the plane polarized energy leaving the said body then is introduced into a uni-axial crystal having a unique axis defining an angle which is acute with respect to the direction of propagation of the said energy into the said uni-axial crystal.

12. The device of claim 10, in which the said plane polarized energy upon departing from the said body is introduced into a polarizing medium having a plane of polarization coinciding with that of the energy before entering the said body.

13. The device of claim 8 in which the plane of polarization of the said introduced energy is coincident with a major crystallographic axis of the said body, and in which the said transmission property is phase.

14. The device of claim 8 in which the entrance and exit surfaces of the said body for the said energy are non-parallel.

No references cited.

ROY LAKE, *Primary Examiner.*

D. HOSTETTER, *Assistant Examiner.*